Jan. 21, 1964     D. H. GARDNER     3,118,217
DIE SET BUSHING AND METHOD OF ASSEMBLING A BUSHING IN A DIE SET
Filed June 20, 1961     2 Sheets-Sheet 1
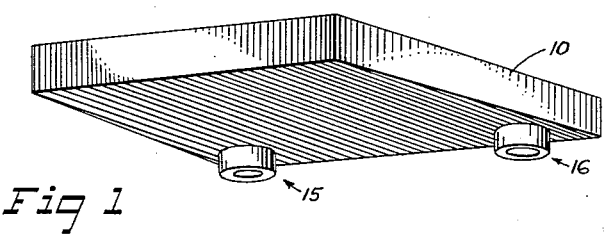
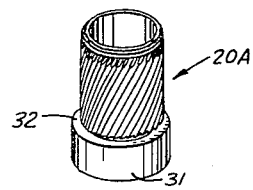
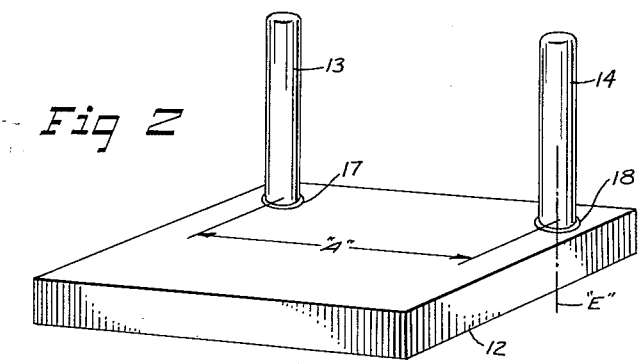
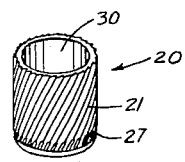
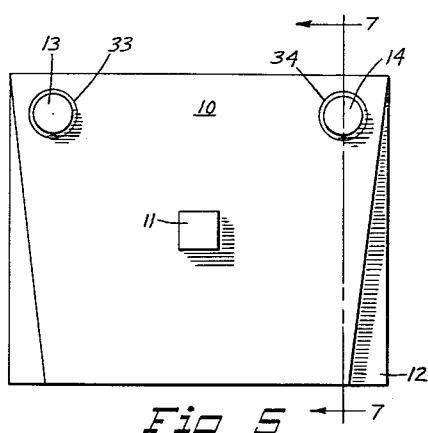
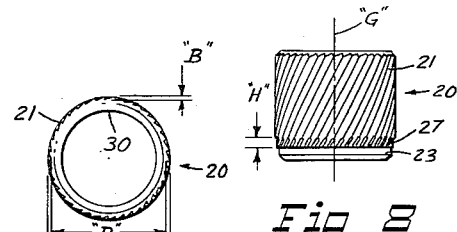
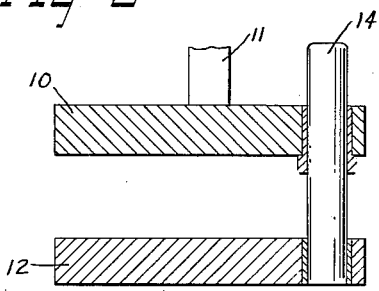
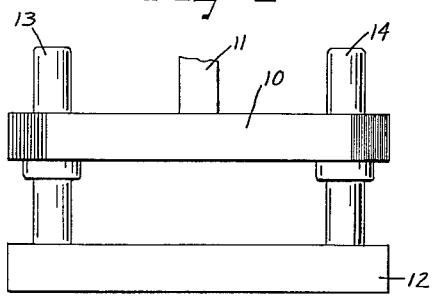
INVENTOR.
DONALD HENRY GARDNER
BY
William Frederick Werner
ATTORNEY Jan. 21, 1964  D. H. GARDNER  3,118,217
DIE SET BUSHING AND METHOD OF ASSEMBLING A BUSHING IN A DIE SET
Filed June 20, 1961  2 Sheets-Sheet 2

INVENTOR.
DONALD HENRY GARDNER
BY
William Frederick Werner
ATTORNEY

United States Patent Office 3,118,217
Patented Jan. 21, 1964

3,118,217
DIE SET BUSHING AND METHOD OF ASSEMBLING A BUSHING IN A DIE SET
Donald Henry Gardner, Cranston, R.I., assignor to Harsco Corporation, Harrisburg, Pa., a corporation of Delaware
Filed June 29, 1961, Ser. No. 118,385
8 Claims. (Cl. 29—149.5)

This invention relates to punch and die sets, and more particularly to an improved leader pin and leader pin bushing construction for aligning the relatively movable parts of such sets and method of assembling the same.

A punch and die set is an assembly consisting of an upper member called the punch holder or plate and a lower member called the die holder or plate. The lower or under surface of the punch holder and the upper or top surface of the die holder are those on which the punch and die sections of a finished punch press tool are mounted. In use the die holder is clamped to the bed or bolster plate of the punch press, while the upwardly extending punch holder shank is fastened in the clamping hole provided therefor in the sliding punch press ram. The tool is actuated by the reciprocating motion of the ram. Mating guide posts and bushings of an assembled die set assist in maintaining tool alignment during die setting and the operation of the tool in the punch press.

These guide posts and bushings are employed in maintaining the punch and die details in true alignment during ram-produced reciprocatory movement of the punch and punch holder relative to the die and die holder. In conventional constructions, the posts are of plain cylindrical formation and are carried by and depend rigidly in relatively spaced order from associated punch holders.

The life of the punches and dies and the accuracy of the work accomplished are directly affected by the accuracy of alignment of the respective moving parts of the die set, and more particularly by the manner in which this alignment is retained over a long period of time.

In the past the bushings and the mating guide posts upon which the bushings slide or reciprocate were ordinarily tightly forced into holes drilled into the punch holder and die holder, respectively. Of course, any alignment thus obtained is dependent upon the accuracy with which the holes into which the parts are to be forced have been drilled. It is well known that by the use of ordinary drills, it is hard to provide holes or openings of any reasonable degree of accuracy, and that such holes or openings can be obtained only by either separately reaming or boring the walls of the openings, with the consequent risk of inaccuracy in the separate operations. It was also necessary to grind the guide pins and the mating bushings on centers and arbors, respectively, to insure absolute concentricity of the outside diameter of the guide pin and the outside diameter of the mating bushings. These many and varied manufacturing operations causes inaccuracies in relative alignment of the guide posts and bushing openings in the plates as well as in the center distance between these openings. A range of less than several thousandths of an inch was not ordinarily or easily or economically obtained. This was especially true because of the methods of assembling the guide posts and bushings in their respective plates.

It is therefore an object of the present invention to provide a method of assembling a die set which is not subject to the limitations, difficulties and costs of manufacture above discussed, and wherein alignment is more readily achieved.

Another feature of the present invention is the ease with which the bushings may be secured in fixed relation with each other in the plate, so that after the punch holder and die holder are in place and the die set is assembled, the final and accurate adjustment, of the mating bushings with the guide posts in the punch holder, will have been accomplished in the assembling operation.

Still another object of the present invention is to provide a guide post and guide post bushing method of assembly in which a plurality of elements are adapted to be permanently secured together to form a die holder plate with guide posts and/or a punch holder plate with mating bushings.

And a further object of the present invention is to provide a punch and die set in which the respective parts are secured and retained in extremely accurate relative positioning, and wherein such accuracy may be retained over long periods of continual use.

And still another object of the present invention is to provide a bushing, as a floating member in relation to a punch holder and/or a die holder, which will respond to the influence of a master fixture, so as to be located in accurate alignment and distance in a punch holder and/or die holder.

Other objects of the present invention will become apparent in part and be pointed out in part in the following specification and claims.

Referring to the drawings wherein similar characters of reference refer to like parts:

FIGURE 1 is a perspective view of the upper plate or punch holder component of a die set.

FIGURE 2 is a perspective view of the lower plate or die holder component of a die set.

FIGURE 3 is a perspective view of the new and improved punch holder guide bushing.

FIGURE 4 is a perspective view of the new and improved die holder bushing.

FIGURE 5 is a plan view of the new and improved die set.

FIGURE 6 is a front elevational view of FIGURE 5.

FIGURE 7 is a sectional view taken on line 7—7 of FIGURE 5.

FIGURE 8 is a side elevational view of the bushing shown in FIGURE 4.

FIGURE 9 is a plan view of FIGURE 8.

Figure 10:
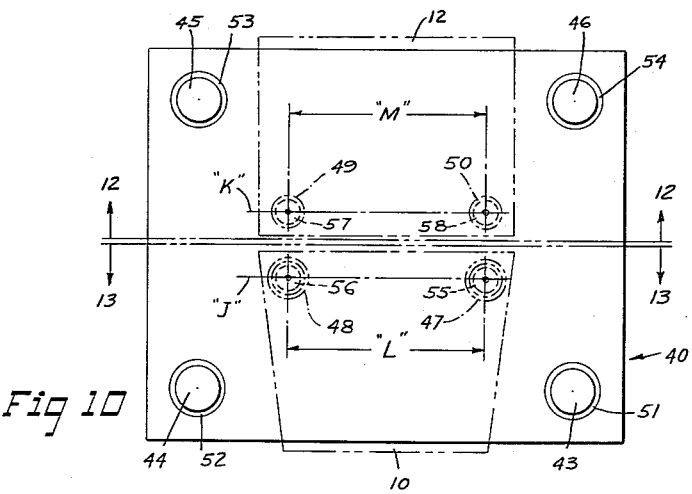
FIGURE 10 is a plan view of the fixture used to assemble the bushings illustrated in FIGURES 3 and 4 with their respective plates or holders.

Referring to FIGURES 1, 2, 5, 6 and 7 of the drawings, reference numeral 10 designates the punch holder or upper plate of a die set, provided with a shank 11, and 12 designates the die holder or lower plate of the same set, said parts being movably positioned with respect to each other by guide pins 13, 14 carried by the die set. Said guide pins 13, 14 being coaxial with and slidable within bushings generally indicated at 15, 16 respectively, carried by the punch holder 10.

According to the present invention the die holder 12 is provided with openings 17, 18 located on a center distance having a variation of approximately ten-thousandths of an inch. (See dimension "A," FIGURE 2). That is the accuracy between the center of opening 17 and the center of opening 18 will vary in the drilling of the openings in successive die plates by a distance equal to ten-thousandths of an inch. It will be noted that the final distance between openings 17, 18 after the bushings are located in the openings can not exceed a variation of one-thousandth of an inch. In toolmakers' parlance it would be termed, "plus or minus half a thousandth." It will therefore be noted that a set of bushings are going to be located on an accurate center distance and accurate alignment even though the initial openings are inaccurately located. After openings 17 and 18 are provided in die holder 12; there is then provided a bushing, generally indicated by reference character 20 (see FIGURES 4, 8, 9 and 14), having helical convolutions or serrations 21 on the outside diameter. It has been found to be important to the successful result to be achieved, that these helical convolutions or serrations 21 correspond to a number twelve thread size; as established by the American Society of Automotive Engineers. A number twelve thread gives a depth of tooth or serration of (.0175) one hundred seventy-five ten-thousands of an inch (see dimension "B," FIGURE 9). Thus, there is provided a difference of (.035) thirty-five thousandths of an inch between the major diameter "C" and the minor diameter "D" (FIGURE 9). The depth of tooth, dimension "B," provides the latitude necessary for the bushing to center itself in opening 18, for example, by correcting its vertical alignment, line "E," FIGURE 2, in opening 18. Number twelve thread A.S.A.E. also positively identifies the pitch of serrations 21.

It has been found that courser threads or finer threads over a number 12 A.S.A.E. are not satisfactory for a one inch inside diameter bushing size. Other bushing sizes would obviously require different thread sizes. The finer thread has less depth in the serration, dimension "B," and therefore less lateral shift is allowed bushing 20 when forced into opening 18. The coarser thread has greater depth in the serration, dimension "B," and such an overabundance of lateral shift for bushing 20, so as to effect the holding power of the serrations in the wall of the opening into which bushing 20 is forced.

Figure 15:
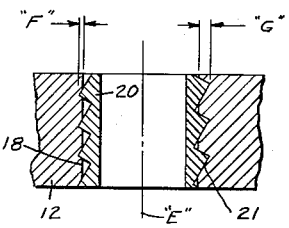
FIGURE 15 is a fragmentary cross sectional view illustrating the centering of a bushing in an opening.

Reference is made to FIGURE 15 wherein a fragmentary cross section of die holder or plate 12 is illustrated with opening 18. Serrations 21 are illustrated in full lines. Dimensions "F" and "G" illustrate that the serrations 21 of bushing 20 will bite deeper in one side of the wall of opening 18 in plate 12 than in the opposite side of the wall of opening 18, so as to be accurately aligned on center line "E" for the maintenance of dimension "A" as dictated by the posts of a fixture, presently to be described. It is important that the pitch and depth of serrations 21 respond accurately to the fixture about to be described.

It has been found that a bushing having serrations which extend the full length of the bushing, tend to prematurely bite into the wall of opening 18, when pressed into opening 18, so that the bushing 20 and not the fixture decided the path of entry of bushing 20 into opening 18. In addition, one of a pair of bushings in a fixture would bite into the wall of an opening before the other bushing bit into the wall of a companion opening. This was obviously unsatisfactory in the result to be achieved, namely, the location of a pair of bushings in a die set, with a center distance having a toolmakers' accuracy without the time, machinery and toolmakers' skill heretofore necessary to provide the wherewithall for such accuracy.

It has also been found, that the provision of a lead surface 23, FIGURE 8, having a smooth contour, does not overcome the tendency of bushing 20 to seek its own path of entry into opening 18 independent of the guidance of the guide post, presently to be described.

In order to provide a bushing (20) which will cooperate to satisfy the objects to be herein obtained, it was found necessary to reduce the initial or entering end of the helical serrations to approximately one half their normal depth.

Figure 14:
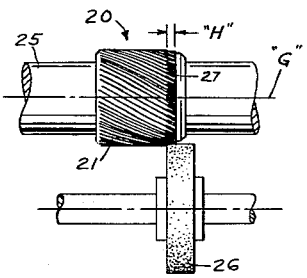
FIGURE 14 is a fragmentary view illustrating one means of aligning the ends of the serrations parallel with the axis of the bushing.
Figure 11:
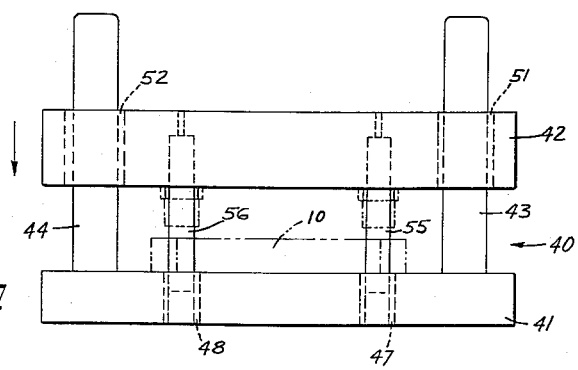
FIGURE 11 is a front elevational view of FIGURE 10.

One way this can be accomplished is illustrated in FIGURE 14. A mandrel 25 is passed through the bushing 20. The bushing 20 is then presented to a grinding wheel 26 with the helical convolutions 21 at an angle of (90 degrees) ninety degrees to the grinding wheel. In this manner, the helical convolutions 21 are provided with an entering end 27, dimension "H," which is parallel to the central axis "G" of bushing 20. Dimension "H" is aproximately (.010) ten-thousandths of an inch long. In this manner, as bushing 20 is forced into opening 18, the cut back or entering end 27 of serrations 21 enters opening 18 in parallel relation to the opening 18. As force is applied to bushing 20, forcing it into opening 18, bushing 20 rotates and serrations 21 cut into the wall of opening 18. The rotation of bushing 20 plus the force applied by the lead post, forces the bushing to locate in the opening on an axis dictated by the lead post because the serrations 21 cut a path in plate 12 for the bushing.

It is the pre-selected spiral contour of the serrations 21 on the bushing 20 in cooperation with the depth of the serrations 21 and the entering end 27 which permits the bushing to react favorably to the dictates of the lead or guide post as to center distance "A," the location of the bushing in plate 12 and the final shape and size of the bushing when located in plate 12.

If serrations are used which are parallel to the center axis (G) of the bushing 20, and not helical in shape or if the serrations are not deep enough, the walls of opening 18 will cause bushing 20 to become elongated or elliptical instead of perfectly round. If the serrations 21 are to deep the bushing will become loose in opening 18.

Bushing 20 when finally located in plate 12 must have absolute concentricity, an exactness of pre-selected dimension on inside diameter 30.

Bushing 20A illustrated in FIGURE 3 and which is finally positioned in punch holder or plate 10 (FIGURE 1) is identical to bushing 20 except a collar 31 is provided on one end of the bushing to provide additional length and support for the bearing area or inside diameter of the bushing. The surface 32 of bushing 20A abuts plate 10 when bushing 20A is located in opening 33, 34 of punch holder 10.

FIGURES 10, 11, 12 and 13 illustrate the fixture used to press bushings 20 or bushings 20A into position in the respective plates 12 or 10.

The fixture, generally indicated by reference character 40, consists of a bottom plate 41 and a top plate 42. Fixture 40 is essentially a die set. However, instead of stamping or cutting metal, it is used as an aligning fixture constructed to provide absolute parallel alignment between bottom plate 41 and top plate 42. This aligning fixture is used in cooperation with and is actuated by a vertical press. In carrying forward the concept of absolute parallel alignment, bottom plate 41 is provided with four leader pins, 43, 44, 45, 46 secured therein with the highest degree of mechanical accuracy known to the tool making art. Bottom plate 41 is also provided with four bushings, 47, 48, 49 and 50.

Top plate 42 is provided with four bushings 51, 52, 53, 54 which are so located and so dimensioned on the inside diameter to slidingly engage leader pins 43, 44, 45, 46, respectively. Top plate 42 is also provided with four guide posts, 55, 56, 57 and 58 fastened therein, as by means of a drive fit. Guide posts 55, 56 are provided with smooth straight sides or diameters. Guide posts 57 and 58 are provided with shoulders 60, 61, respectively. Guide posts 55, 56, 57 and 58 slidingly engage bushings 47, 48, 49 and 50, respectively.

The alignment of guide post 55 with guide post 56, center line "J," and the alignment of guide post 57 with guide post 58, center line "K" is as accurate as the tool makers' art will allow. In the same manner, the center distance, dimension "L," and the center distance, dimension "M," between guide posts 55, 56 and 57, 58 is as accurate as is mechanically possible to provide. Thus, a set of master guide posts are provided, which will determine the alignment and center distance of bushings 20 in plate 12 and bushings 20A in plate 10.

Figure 12:
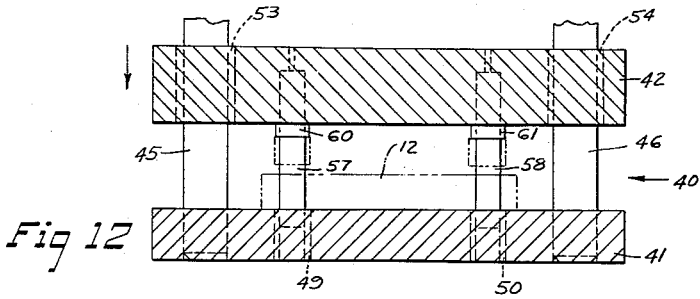
FIGURE 12 is a transverse cross sectional view taken on line 12—12 of FIGURE 10.
Figure 13:
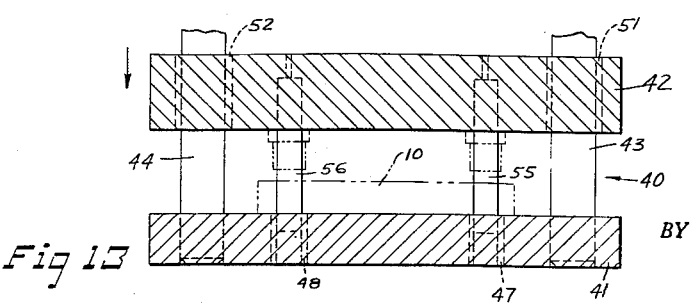
FIGURE 13 is a transverse cross sectional view taken on line 13—13 of FIGURE 10.

In operation, die holder or plate 12 having openings 17, 18 provided therein, is placed on bottom plate 41 with openings 17, 18 in vertical alignment with guide posts 57, 58 respectively (FIGURES 10 and 12). A bushing 20 will be placed on each of the guide posts 57, 58. Top plate 42 under great pressure, such as provided by a vertical press, will ride on leader pins 43, 44, 45 and 46 through bushings 51, 52, 53, 54 slidingly engaging said leader pins 43, 44, 45 and 46, respectively, toward bottom plate 41. This movement, in the direction of the arrows in FIGURES 11, 12 and 13, will cause lead surface 23, followed by the second lead surface, dimension "H," to enter opening 17 in reference to bushing 20 on guide post 58, the bushing will enter opening 18. Guide posts 57, 58 will dictate and determine the location of bushings 20 in openings 17, 18, as to center distance and alignment. As the serrations 21 engage the wall of openings 17, 18 bushings 20 will rotate and thereby cut themselves into position in plate 12.

In the same manner bushings 20A are placed on guide posts 55, 56 and are inserted in openings 33, 34 in plate 10 with shoulder 32 abutting plate 10.

Posts 13, 14 are press fitted into bushings 20 after bushings 20 are located in openings 17, 18. This function forms no part of the present invention. It is recited to show the completion of a die set. Posts 13, 14 will slidingly engage bushings 20A in plate 10 to complete the die set structure.

It will be seen that applicant has provided a die set wherein the expensive procedure of finishing a drilled opening is eliminated. Also eliminated is the necessity of grinding the guide post and the outside of the mating bushing for concentricity.

The elimination of the grinding of the outside diameter of the bushing permits the bushing to be hardened to a greater degree. Such increased hardness may be by carbonitride hardening. Thus, the inside diameter, or the surface of the bushing subject to wear, is provided with a greatly improved wearing surface.

It will be noted that the art to which this invention is directed deals with minute fractions of an inch or tens of thousandths of an inch. It requires expensive machinery and great manual skill on the part of tool makers to provide steel parts with such close tolerances on dimensions. However, since the plates 10, 12 are fabricated from mild steel and the bushings are fabricated from extremely hard steel, it was found that by forcing the hard steel bushing into the softer steel plate, the softer plate reacted to squeeze the bushing to hold the bushing in position. The squeezing action is manifested on the outside and through the walls of the bushing, on the inside diameter of the bushing, whereby the inside diameter of the bushing would be reduced by one half a thousandth of an inch on a concentricity dictated by the post in the fixture. Thus an accurate dimension and shape are obtained without the usual expensive manufacturing procedures.

Having shown and described preferred embodiments of the present invention by way of example, it should be realized that structural changes could be made and other examples given without departing from either the spirit or scope of this invention.

What I claim is:

1. A bushing for use in a die set comprising a hollow body member having a longitudinal axis and provided with a plurality of helical serrations, an entering end on the outside diameter of one end of said hollow body member, said entering end having a diameter reduced by a dimension approximating one-half the normal depth of said helical serrations and parallel to said longitudinal axis.

2. A bushing for use in a die set comprising a hollow body member approximating one inch on the inside diameter and having a longitudinal axis and provided with a plurality of helical serrations approximately seventeen-thousandths of an inch deep on the outside diameter, a plain lead surface on the outside diameter of one end of said bushing, an entering end on the outside diameter adjacent said plain lead surface, said entering end having a length of approximately ten-thousandths of an inch long, said entering end having a recess approximating one-half the normal depth of said helical serrations and parallel to said longitudinal axis.

3. A carbonitride hardened bushing for use in a die set comprising a hollow longitudinal body member provided with a plurality of helical serrations on the outside diameter, a plain lead surface on the outside diameter of one end of said bushing, an entering end on the outside diameter adjacent said plain lead surface, said entering end having a recess approximately one-half the normal depth of said helical serrations and parallel to said hollow longitudinal body member.

4. A bushing for use in a die set comprising a hollow longitudinal body member provided with a plurality of helical serrations on the outside diameter and having a pitch and depth approximating a number twelve thread, American Society of Automotive Engineers Standard, an entering end having a recess approximately one-half the normal depth of said serrations, said recess being parallel to said hollow longitudinal body member.

5. The method of assembling bushings in a die set which includes the steps of providing openings in a die holder and aligned openings in a punch holder, placing said punch and die holders in a fixture having master guide posts, placing bushings on said master guide posts and closing the fixture to drive the bushings into said openings.

6. The method of assembling bushings in a die set which includes the steps of providing openings in a die holder and aligned openings in a punch holder, placing said punch and die holders in a fixture having master guide posts, placing bushings having helically serrated outer surfaces on said master guide posts and then closing the fixture to drive the bushings into said openings with an axial and rotating motion to center them in axial alignment with the guide posts.

7. The method of assembling a plurality of bushings in a die set which includes the steps of providing helical serrations on the outside diameter of the bushings, carbonitride hardening the bushings, and providing openings in a die holder and aligned openings in a punch holder, placing a fixture in a vertical press, placing said die and punch holders in a fixture having master guide posts, placing said bushings on said master guide posts, and then actuating said vertical press to close said fixture to drive said bushings simultaneously into said openings with an axial and rotating motion to center said bushings in axial alignment with said guide posts and to provide said bushings on the inside diameter with the shape and size of said guide posts.

8. The method of assembling a plurality of hollow body members in a die set which includes the steps of providing each hollow body member with a longitudinal axis and with a plurality of helical serrations on the outside of each hollow body member, an entering end on the outside diameter of one end of each hollow body member, the entering end having a diameter reduced by a dimension approximating one half the normal depth of the helical serrations, the entering end having a contour parallel to a longitudinal axis, carbonitride hardening each hollow body member, providing openings in a die holder and aligned openings in a punch holder, placing a fixture in a vertical press, placing said die and punch holders in a fixture having master guide posts, placing a hollow body member on each of said master guide posts, and then actuating said vertical press to close said fixture to drive said hollow body members simultaneously into said openings with an axial and rotating motion to center each hollow body members in axial alignment with the guide posts and to provide each hollow body member on the inside diameter with the shape and size of the guide post.

References Cited in the file of this patent

UNITED STATES PATENTS

| | | |
|---|---|---|
| 1,469,793 | Johnson et al. | Oct. 9, 1923 |
| 1,700,100 | Smith | Jan. 22, 1929 |
| 1,750,544 | Walter | Mar. 11, 1930 |
| 2,180,282 | Leighton | Nov. 14, 1939 |
| 2,180,283 | Leighton | Nov. 14, 1939 |
| 2,891,302 | Fuglie et al. | June 23, 1959 |
| 3,067,509 | Welles | Dec. 11, 1962 |